United States Patent
Hatti et al.

(10) Patent No.: US 7,301,582 B2
(45) Date of Patent: Nov. 27, 2007

(54) LINE ADDRESS COMPUTER FOR PROVIDING LINE ADDRESSES IN MULTIPLE CONTEXTS FOR INTERLACED TO PROGRESSIVE CONVERSION

(75) Inventors: Mallinath Hatti, Bangalore (IN); Lakshmanan Ramakrishnan, Bangalore (IN)

(73) Assignee: Broadcom Corporation, Irvine, CA (US)

(*) Notice: Subject to any disclaimer, the term of this patent is extended or adjusted under 35 U.S.C. 154(b) by 441 days.

(21) Appl. No.: 10/714,833

(22) Filed: Nov. 14, 2003

(65) Prior Publication Data
US 2005/0041145 A1 Feb. 24, 2005

Related U.S. Application Data

(60) Provisional application No. 60/495,695, filed on Aug. 14, 2003.

(51) Int. Cl.
*H04N 11/06* (2006.01)

(52) U.S. Cl. ...................... 348/488; 348/715

(58) Field of Classification Search ........ 348/448–452, 348/714–719; 345/547; *H04N 9/64*
See application file for complete search history.

(56) References Cited

U.S. PATENT DOCUMENTS

| | | | | | |
|---|---|---|---|---|---|
| 4,698,674 A | * | 10/1987 | Bloom | .................... | 348/448 |
| 4,866,520 A | * | 9/1989 | Nomura et al. | ............. | 348/441 |
| 5,835,150 A | * | 11/1998 | Choi | .................... | 348/441 |
| 6,040,868 A | * | 3/2000 | Jun | .................... | 348/448 |
| 6,633,344 B1 | * | 10/2003 | Worrell et al. | ............. | 348/714 |

* cited by examiner

*Primary Examiner*—Michael H. Lee
(74) *Attorney, Agent, or Firm*—McAndrews Held & Malloy Ltd.

(57) ABSTRACT

Presented herein is a system and method for a line address computer for providing line addresses in multiple contexts for interlaced to progressive conversion. A feeder fetches a first line from a top field, fetches a first line from a bottom field corresponding to the top field, after fetching the first line from the top field, and fetches a second line from the top field after fetching the first line from the bottom field. The second line from the top field is adjacent to the first line in the top field.

6 Claims, 8 Drawing Sheets

```
           YCY        YCY                    YCr Y      YCr Y
100(0)     YCY YCY........YCY                YCr Y      YCr Y
100(1)     YCY YCY........YCY                YCb Y      YCb Y
100(2)     YCY YCY........YCY                YCb Y      YCb Y
100(3)     YCY YCY........YCY                YCr Y      YCr Y
100(4)     YCY YCY........YCY                YCr Y      YCr Y
100(5)     YCY YCY........YCY                YCb Y      YCb Y
100(6)     YCY YCY........YCY                YCb Y      YCb Y
  ..              ..                            ..         ..
100(N)     YCY YCY........YCY                YCb Y ..... YCb Y

FIGURE 2                           FIGURE 4

Top Field  100(0)  YCY YCY........YCY
           100(2)  YCY YCY........YCY
           100(4)  YCY YCY........YCY
           100(6)  YCY YCY........YCY
             ..           ..
           100(N-1) YCY YCY........YCY Bottom Field 100(1) YCY YCY........YCY
             100(3) YCY YCY........YCY
             100(5) YCY YCY........YCY
             100(7) YCY YCY........YCY
               ..          ..
             100(N) YCY YCY........YCY

FIGURE 3
```

| 100(0) 100(2) ⋮ 100(30) | $M_{0,0}^y/M_{0,0}^c$ | $M_{0,1}^y/M_{0,1}^c$ | ............... | $M_{0,NMBX-1}^y/M_{0,NMBX-1}^c$ |
|---|---|---|---|---|
| 100(32) 100(34) ⋮ 100(62) | $M_{1,0}^y/M_{1,0}^c$ | $M_{1,1}^y/M_{1,1}^c$ | ............... | $M_{1,NMBX-1}^y/M_{1,NMBX-1}^c$ |
| ⋮ | | | | |
| | $M_{NMBY-1,0}^y$ $M_{1,0}^c$ | $M_{NMBY-1,1}^y$ $M_{1,1}^c$ | ............... | $M_{NMBY-1,NMBX-1}^y$ $M_{1,NMBX-1}^c$ |

Top Field

| 100(1) 100(3) ⋮ 100(31) | $M_{0,0}^y/M_{0,0}^c$ | $M_{0,1}^y/M_{0,1}^c$ | ............... | $M_{0,NMBX-1}^y/M_{0,NMBX-1}^c$ |
|---|---|---|---|---|
| 100(33) 100(35) ⋮ 100(63) | $M_{1,0}^y/M_{1,0}^c$ | $M_{1,1}^y/M_{1,1}^c$ | ............... | $M_{1,NMBX-1}^y/M_{1,NMBX-1}^c$ |
| ⋮ | | | | |
| | $M_{NMBY-1,0}^y$ $M_{1,0}^c$ | $M_{NMBY-1,1}^y$ $M_{1,1}^c$ | ............... | $M_{NMBY-1,NMBX-1}^y$ $M_{1,NMBX-1}^c$ |

Bottom Field

FIGURE 5A

TOP FIELD

| | |
|---|---|
| 48Y(0) | YYYYYYYYYYYYYYYY |
| 48Y(1) | YYYYYYYYYYYYYYYY |
| 48Y(2) | YYYYYYYYYYYYYYYY |
| ⋮ | |
| 48Y(15) | YYYYYYYYYYYYYYYY |
| 48Y(16-31) | $M_{0,1}^y$ |
| 48Y(32-47) | $M_{0,2}^y$ |
| ⋮ | |
| | $M_{NMBY-1,NMBX-1}^y$ |
| ⋮ | |
| BOTTOM FIELD | |
| | $M_{0,0}^y$ |
| | $M_{0,1}^y$ |
| | ⋮ |
| | $M_{0,NMBX-1}^y$ |
| | $M_{1,0}^y$ |
| | ⋮ |
| | $M_{1,NMBX-1}^y$ |
| | ⋮ |

FIGURE 5B

TOP FIELD

| |
|---|
| 48C(0)<br>CbCbCrCrCbCbCrCrCbCbCrCrCbCbCrCr |
| 48C(1) CbCbCrCrCbCbCrCrCbCbCrCrCbCbCrCr |
| 48C(2) CbCbCrCrCbCbCrCrCbCbCrCrCbCbCrCr |
| : |
| 48C(7) CbCbCrCrCbCbCrCrCbCbCrCrCbCbCrCr |
| 48C(8-15) $M_{0,1}^{c}$ |
| 48C(16-23) $M_{0,2}^{c}$ |
| : |
| $M_{NMBC-1, NMBX-1}^{c}$ |
| : |
| BOTTOM FIELD |
| $M_{0,0}^{c}$ |
| $M_{0,1}^{c}$ |
| : |
| $M_{0,NMBX-1}^{c}$ |
| $M_{1,0}^{c}$ |
| : |
| $M_{1,NMBX-1}^{c}$ |
| : |

FIGURE 5C

FIG. 6
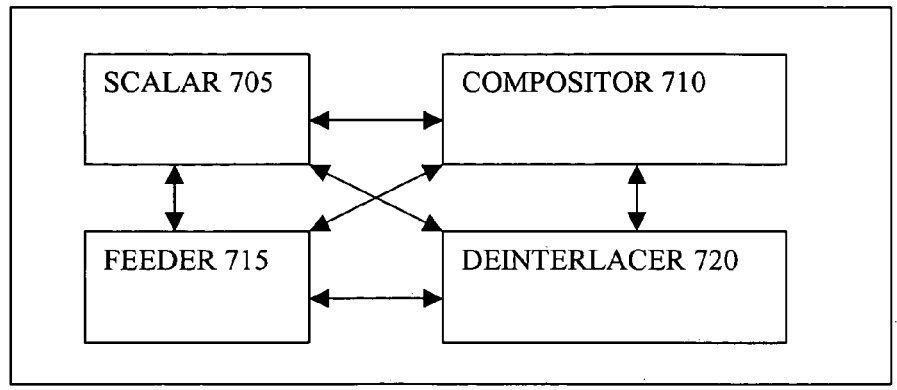
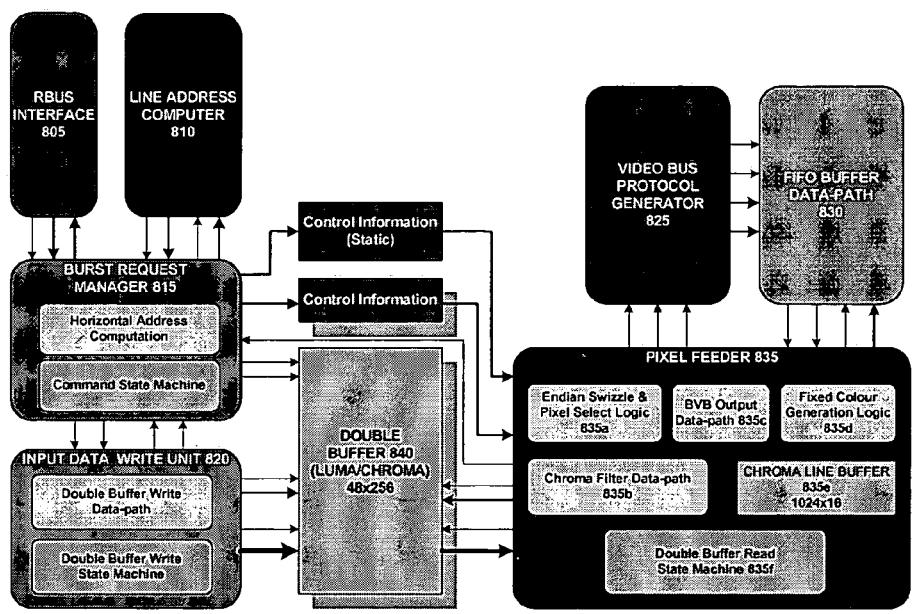
FIGURE 7

LINE ADDRESS COMPUTER FOR PROVIDING LINE ADDRESSES IN MULTIPLE CONTEXTS FOR INTERLACED TO PROGRESSIVE CONVERSION

RELATED APPLICATIONS/PRIORITY CLAIMS

This application claims priority to Provisional Application for U.S. patent, application Ser. No. 60/495,695, entitled "LINE ADDRESS COMPUTER FOR FACILITATING CHROMA CONVERSION", filed Aug. 14, 2003. This application is related to U.S. patent application, Ser. No. 60/495,301, entitled "PIXEL REORDERING LOGIC FOR MULTIPLE FORMATS IN A FEEDER", filed Aug. 14. 2003, by Hatti, et. al., which is incorporated herein by reference. This application is also related to the following U.S. Patent Applications, each of which are incorporated herein by reference: "Line Address Computer for Decoding the Line Addresses of Decoded Video Data", U.S. patent application Ser. No. 10/703,332, filed Nov. 7, 2003 by Hatti, et. al., and claiming priority to Provisional Application for Pat. Ser. No. 60/495,695. "Pixel Reordering and Selection Logic", U.S. patent application Ser. No. 10/712,482, filed Nov. 13, 2003 by Hatti, et. al., and claiming priority to Provisional Application for Pat. Ser. No. 60/495,301. "Line Address Computer for Providing Coefficients to Chroma Filter", U.S. patent application Ser. No. 10/712,638, filed Nov. 13, 2003 by Hatti, and claiming priority to Provisional Application for Pat. Ser. No. 60/495,695.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

A video decoder receives encoded video data and decodes and/or decompresses the video data. The decoded video data comprises a series of pictures. A display device displays the pictures. The pictures comprise a two-dimensional grid of pixels. The display device displays the pixels of each picture in real time at a constant rate. In contrast, the rate of decoding can vary considerably for different video data. Accordingly, the video decoder writes the decoded pictures in a picture buffer.

Among other things, a display engine is synchronized with the display device and provides the appropriate pixels to the display device for display. The display engine determines the picture buffer address of the appropriate pixels, in order to provide the appropriate pixels to the display device. The address of the appropriate pixels is dependent on, among other things, the chroma format of the decoded pictures, the chroma format of the display device, the storage format, whether the pictures are interlaced or progressive, and whether the display is interlaced or progressive.

The chroma format of pictures describes the spatial relationship of chroma pixels to the luma pixels. A picture comprises a two dimensional grid of luma pixels Y, chroma red difference pixels Cr, and chroma blue difference pixels Cb. Generally speaking, the luma pixels are the greatest in number, and often as many, if not more, than the chroma Cr, and chroma Cb pixels combined. The grid of chroma Cr pixels and the grid of chroma Cb pixels are overlayed the grid of luma pixels during display. The overlaid grid of chroma pixels Cr/Cb can have a variety of spatial relationships with the luma pixels. For example, every other luma pixel can be co-located with a chroma Cr and chroma Cb pixel. Alternatively, the chroma pixels Cr/Cb may not align with the luma pixels Y. Examples of chroma formats include MPEG-1/2/4, 4:2:0 (now referred to as MPEG 4:2:0), MPEG 2/4 4:2:2 (now referred to as MPEG 4:2:2), DV-25, and MPEG-2 TM5.

Where the chroma format of the decoded pictures (decoded chroma format) and the chroma format of the display pictures (display chroma format) are different, chroma pixels corresponding to chroma pixel positions in the display chroma format are interpolated from the chroma pixels in the decoded picture that are nearest or surround the chroma pixel positions. During display, the chroma pixels in the decoded frame are replaced by the interpolated chroma pixels that are displayed in their corresponding chroma pixel positions in the display chroma format. One advantage of the planar format is that reading consecutive memory locations produces a rasterized bitstream of either the luma, chroma CrCr, or chroma Cb pixels.

The video decoder can also store a decoded picture in a number of different ways. In the planar format, the luma pixels are stored in raster order in one array, the chroma Cr pixels are stored in raster order in a second array, and the chroma Cb pixels are stored in raster order in a third array. In the packed YUV format, the luma, chroma CrCr, and chroma Cb pixels are packed together in a single array in raster order. One advantage of the packed YUV format is that reading consecutive memory locations produces a rasterized bitstream of the luma, chroma CrCr, and chroma Cb pixels.

Another format for storing decoded frames is known as the macroblock format. Several encoding and compression standards provide for a picture to be divided into two-dimensional blocks of luma pixels, chroma Cr pixels Cr, and chroma Cb pixels Cb. A macroblock comprises a block of luma Y pixels, and the blocks of chroma CrCr/Cb pixels are co-located therewith. The macroblocks are encoded, compressed, and represented by a data structure. The picture in its encoded and compressed form, is represented by the data structures representing the constituent macroblocks.

During decoding, the macroblocks are decoded/decompressed. As each macroblock is decoded, the video decoder stores the macroblock into a memory. A consecutive set of memory locations in one array store the block of luma pixels, and a consecutive set of memory locations in another array store the blocks of chroma Cr and chroma Cb pixels together.

Unlike planar storage format, or packed YUV storage format, however, reading consecutive memory locations where the macroblock format is used does not produce a rasterized bitstream.

The decoded pictures and the display can either be interlaced or progressive. Interlaced pictures are captured in two fields at two distinct time instances. All even numbered lines in the picture are captured/displayed at one discrete time, and all odd-numbered lines in the picture are captured/displayed at another discrete time. Both the National Television Standards Committee (NTSC) and Phase Alternate Lining (PAL) use interlacing. In contrast to interlaced pictures, progressive pictures are presented at the same discrete time instance.

Progressive display units are becoming more and more common. Most computer monitors are progressive display devices. Additionally, many television sets are capable of both interlaced and progressive displaying because more of the content displayed on television screens is from a progressive video sequence. For example, most motion pictures on Digital Versatile Discs (DVDs) are a progressive scan video sequence. Therefore, television sets can be equipped to display the DVD content as a progressive sequence. Additionally, many of the proposed high-definition television standards (HDTV) involve both progressive and interlaced displaying.

Conventionally, after each horizontal synchronization pulse, the host processor calculates the address of the first pixels of a line and the parameters for chroma format conversion after each horizontal synchronization pulse. The host processor then programs the display engine with the foregoing. Programming the display engine at each horizontal synchronization pulse consumes considerable bandwidth from the host processor.

An inherent problem exists when displaying an interlaced video on a progressive display. Most proposed solutions involve processing and analyzing the video signal in both the spatial and temporal domains, and producing a converted progressive picture based on the interlaced video source. Various methods for approaching the problem involve the utilization of vertical filters, vertical-temporal filters, adaptive two-dimensional and temporal filters, motion adaptive spatio-temporal filters, and motion-compensated spatio-temporal filters.

Very complex deinterlacers analyze the picture information in the spatial and temporal domains, sometimes storing several consecutive fields of video in memory in order to analyze the characteristics of the video sequence and make decisions on a pixel-by-pixel basis as to how to display the video information in a progressive display. Very simple deinterlacers perform only spatial filtering regardless of motion in the sequence. However, the foregoing look at actual picture data, and overlook the origin of the picture data, especially when the source is a compressed bit stream.

A particularly complex case arises when interlaced decoded pictures with a decoded chroma format are to be displayed on a progressive display with a different display chroma format.

The conventional approach in such a case is to convert the chroma format of the top field and bottom field, thereby generating a new top field and a new bottom field with the display chroma format. The new top field and bottom fields are provided to a deinterlacing filter. The deinterlacing filter operates on the new top field and the new bottom field to develop a progressive picture.

The foregoing approach has several disadvantages. The entire top field and bottom field are converted prior to deinterlacing. As a result, the advantages of pipelining are lost. Additionally, a large amount of data, e.g., the new top field and bottom field, are provided to the deinterlacer at one time. This causes increased reliance on software for data management, and the speed advantages of hardware are lost. Additionally, because the chroma format conversion does not occur in real-time, to guarantee completion of the chroma conversion and the interlaced to progressive conversion by display time, the chroma conversion occurs at a greater time prior to display. This reduces the processing power that is available to other functions that need to occur well in advance of display time.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

A line address computer for providing line addresses in multiple contexts for interlaced to progressive conversion is presented herein.

In one embodiment, there is presented a method for displaying frames. The method comprises fetching a first line from a top field, fetching a first line from a bottom field corresponding to the top field, after fetching the first line from the top field, and fetching a second line from the top field after fetching the first line from the bottom field, wherein the second line from the top field is adjacent to the first line in the top field.

In another embodiment, there is presented a system for displaying frames. The system comprises a first memory, a second memory and a feeder. The first memory stores a top field. The second memory stores a bottom field, wherein the bottom field is associated with the top field. The feeder fetches a first line from the top field, fetches a first line from a bottom field corresponding to the top field, after fetching the first line from the top field, and fetches a second line from the top field after fetching the first line from the bottom field, wherein the second line from the top field is adjacent to the first line in the top field.

These and other advantages and novel features of the present invention, as well as details of an illustrated embodiment thereof, will be more fully understood from the following description and drawings.

BRIEF DESCRIPTION OF SEVERAL VIEW OF THE DRAWINGS

FIG. 2 is a block diagram of an exemplary progressive picture with the display chroma format 4:2:2;

FIG. 3 is a block diagram of an exemplary interlaced picture with the display chroma format 4:2:2

FIG. 4 is a block diagram of an exemplary progressive picture with the decoded chroma format DV-25 4:2:0;

Figure 8:
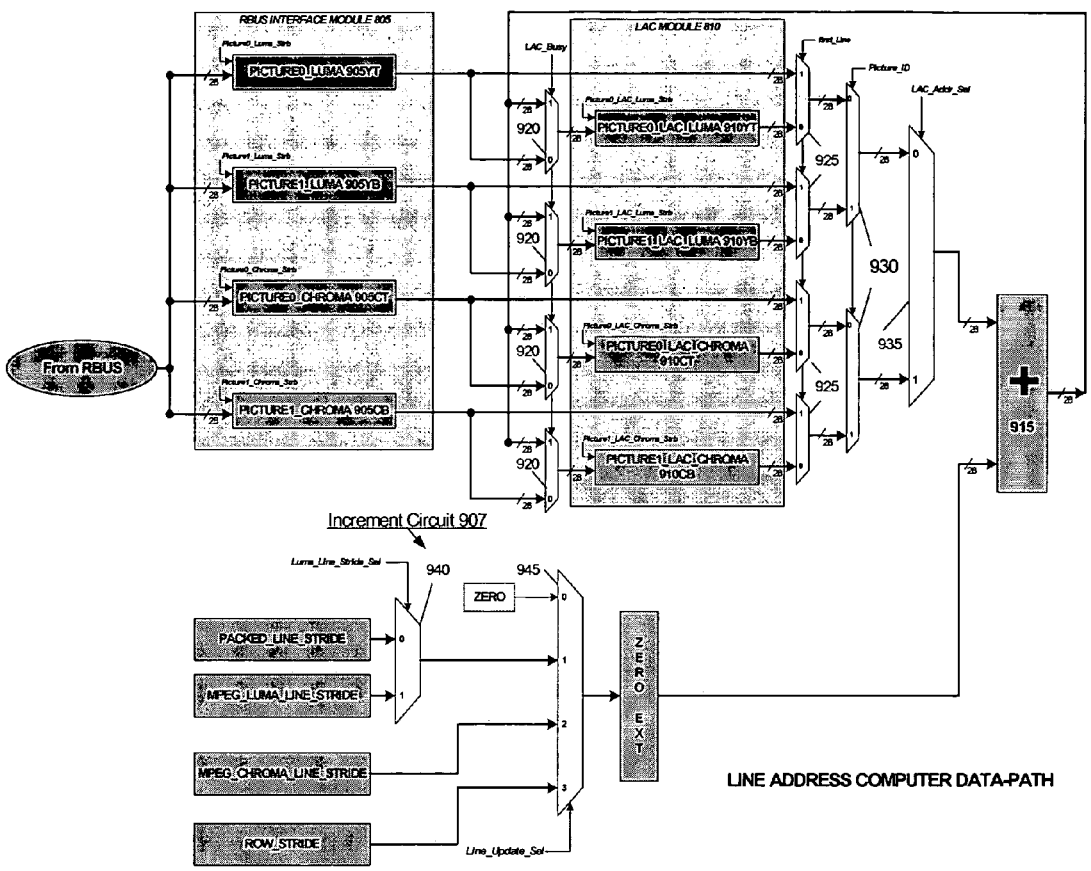
Figure 9:
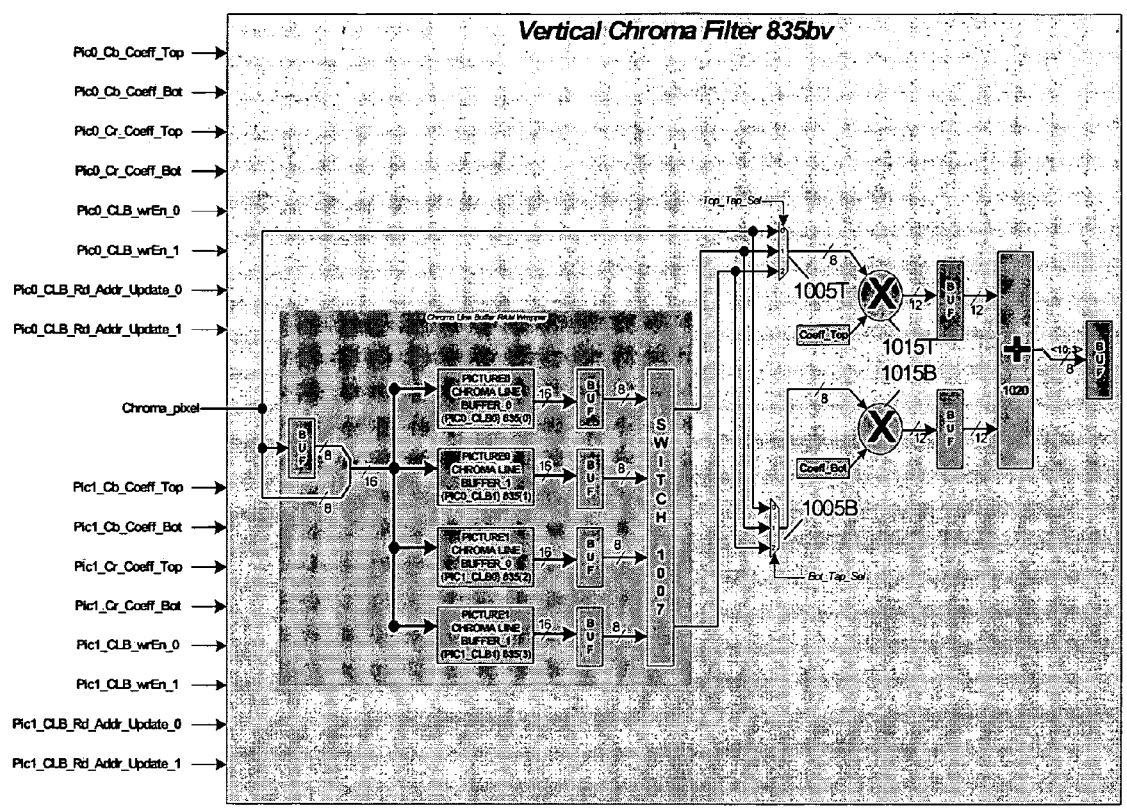

FIGS. 5A-C are a block diagram describing the storage of a picture in macroblock format;

FIG. 6 is a block diagram of the display engine in accordance with an embodiment of the present invention;

FIG. 7 is a block diagram describing a feeder in accordance with an embodiment of the present invention; and FIG. 8 is a block diagram describing a line address computer data path in accordance with an embodiment of the present invention; and FIG. 9 is a block diagram describing a vertical chroma filter data path in accordance with an embodiment of the present invention.

DETAILED DESCRIPTION OF THE DRAWINGS

Figure 1:
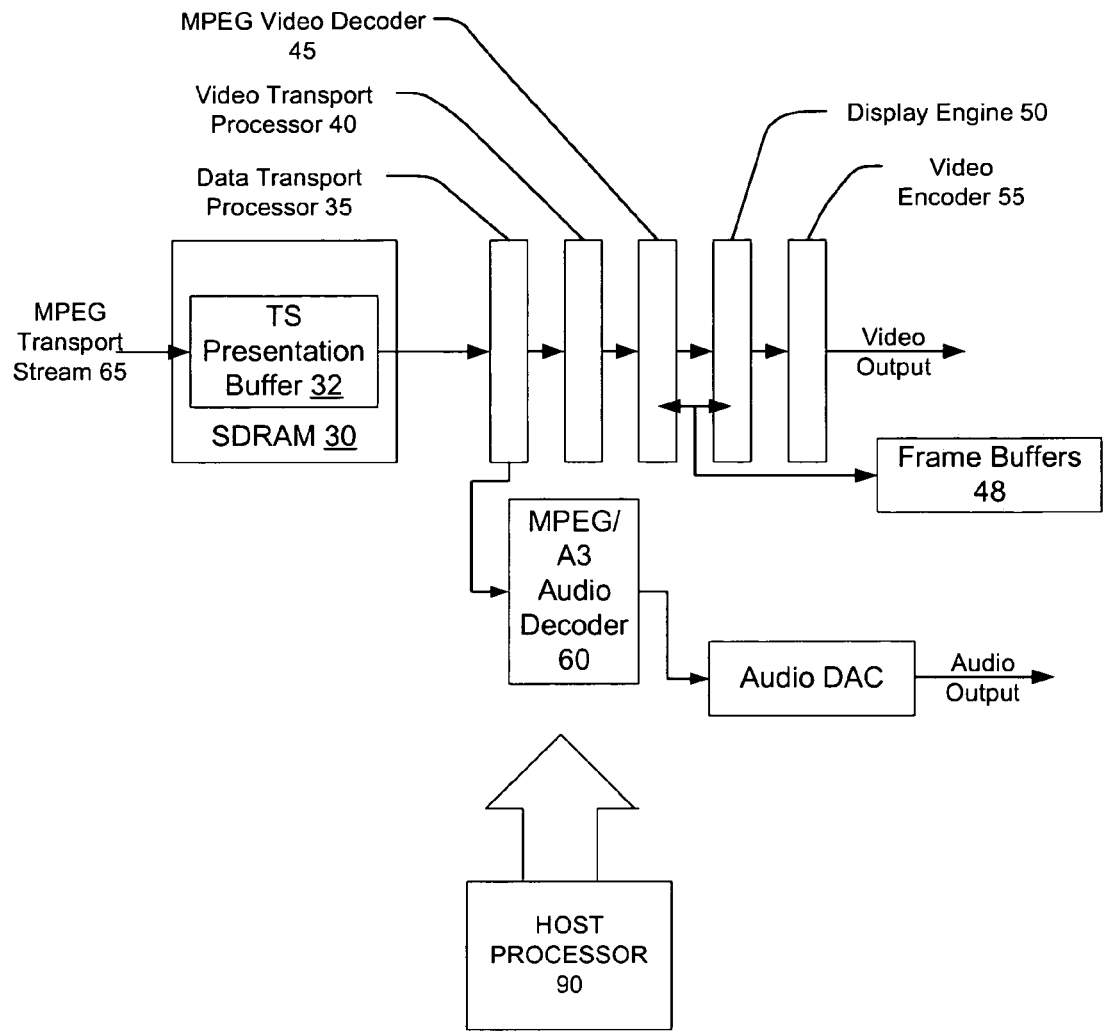
FIG. 1 is a block diagram of an exemplary decoder in accordance with an embodiment of the present invention.

Referring now to FIG. 1, there is illustrated a block diagram of an exemplary decoder system for decoding compressed video data, configured in accordance with an embodiment of the present invention. A processor, that may include a CPU 90, reads transport stream 65 into a transport stream buffer 32 within an SDRAM 30.

The data is output from the transport stream buffer 32 and is then passed to a data transport processor 35. The data transport processor 35 then demultiplexes the transport stream 65 into constituent transport streams. The constituent packetized elementary stream can include for example, video transport streams, and audio transport streams. The data transport processor 35 passes an audio transport stream to an audio decoder 60 and a video transport stream to a video transport processor 40.

The video transport processor 40 converts the video transport stream into a video elementary stream and provides the video elementary stream to a video decoder 45. The video decoder 45 decodes the video elementary stream, resulting in a sequence of decoded video frames. The decoding can include decompressing the video elementary stream. It is noted that there are various standards for compressing the amount of data required for transportation and storage of video data, such as MPEG-2.

The decoded video data includes a series of pictures. The pictures are stored in a frame buffer 48. The frame buffer 48 can be dynamic random access memory (DRAM) comprising 128 bit/16 byte gigantic words (gwords). It is also noted that in certain standards, such as MPEG-2, the order that pictures are decoded is not necessarily the order that pictures are presented. Accordingly, several pictures can be stored in the frame buffer 48 at a given time.

Referring now to FIG. 2, there is illustrated a block diagram of an exemplary progressive display picture 100 with a display chroma format in accordance with a display format being 4:2:2 chroma format. The display picture 100 includes any number of rows 100(0) ... 100(N). Each row 100(0) ... 100(N) includes a row of luma pixels Y and half as many chroma Cr and chroma Cb pixels (denoted by a C). Every other luma pixel Y is co-located with a chroma Cr and chroma Cb pixel. The pixels are displayed in raster order. On a progressive display, in raster order the rows are displayed from left to right, in the order, 100(0), 100(1), ... 100(N).

Referring now to FIG. 3, there is illustrated a block diagram of an exemplary interlaced display picture 100 with a display chroma format in accordance with a display format being 4:2:2 chroma format. The interlaced picture 100 includes a top field comprising the even-numbered rows 100(0), 100(2), 100(4), 100(6), ... 100(N−1), and a bottom field comprising the odd-numbered rows 100(1), 100(3), 100(5), ... 100(N). Each row 100(0) ... 100(N) includes a row of luma pixels Y and half as many chroma Cr and chroma Cb pixels (denoted by a C). Every other luma pixel Y is co-located with a chroma Cr and chroma Cb pixel.

The pixels are displayed in raster order. On an interlaced display, in raster order the rows are displayed from left to right, in most cases starting from the top field, in the order 100(0), 100(2), ... 100(N−1), followed by the bottom field 100(1), 100(3), ... 100(N). The top field and bottom field are associated adjacent, but different display times, in contrast to progressive pictures.

The display engine 50 is responsible for providing a bitstream comprising a rasterized display picture to a display device, such as a monitor or a television. A display device displays the pictures in a specific predetermined display format with highly synchronized timing. Each row 100(x) of a picture is displayed at a particular time interval. The display engine 50 provides the pixels to the display device for display, via the video encoder.

The display device and the display engine 50 are synchronized by means of vertical synchronization pulses and horizontal synchronization pulses. When the display device 65 begins displaying a new picture 100 or field (top field/bottom field), the display device transmits a vertical synchronization pulse. Each time the display device 65 begins displaying a new row 100(x), the display device 65 sends a horizontal synchronization pulse. The display engine 50 uses the horizontal and vertical synchronization pulses to provide a stream comprising the pixels for the display picture at a time related to the time of display.

The display engine 50 provides the stream comprising pixels for the display picture based on the decoded picture stored in the frame buffer 48. However, the decoded picture in the frame buffer 48 may have a different decoded chroma format from the display format. Where the decoded chroma format is different from the display chroma format, the display engine 50 provides a stream of interpolated chroma pixels corresponding to the chroma pixel positions in display chroma format. The display engine interpolates the interpolated chroma pixels from chroma pixels in the decoded frame that are nearest or surround the chroma pixels in the display chroma format. Therefore, the display engine 50 generates a stream comprising the luma pixels of the decoded frame and the interpolated chroma pixels (or chroma pixels of the decoded frame are the decoded chroma format and the display chroma format are the same).

Accordingly, the display engine 50 determines the frame buffer 48 address of the appropriate pixels, in order to provide the stream of pixels for the display picture to the display device. The address of the appropriate pixels is dependent on, among other things, the chroma format of the decoded pictures, the chroma format of the display device, the storage format, whether the pictures are interlaced or progressive, and whether the display is interlaced or progressive.

The chroma format of pictures describes the spatial relationship of chroma pixels to the luma pixels. A picture comprises a two dimensional grid of luma pixels Y, chroma Cr pixels, and chroma Cb pixels. Generally speaking, the luma pixels are the greatest in number, and often as many, if not more, than the chroma Cr, and chroma Cb pixels combined. The grid of chroma Cr pixels and the grid of chroma Cb pixels are overlayed the grid of luma pixels during display. The overlaid grid of chroma pixels Cr/Cb can have a variety of spatial relationships with the luma pixels. For example, in 4:2:2 format for both progressive and interlaced pictures, as shown in FIGS. 2 and 3, every other luma pixel Y is co-located with a chroma Cr and chroma Cb pixel. However, in another format, the chroma Cr/Cb and luma pixels Y may have a different spatial relationship.

Referring now to FIGS. 4, there are described a progressive picture (FIG. 4), with the decoded chroma format DV25 4:2:0. Progressive picture 100 comprise any number of rows 100(0) ... 100(N) of luma pixels Y. Every other luminance pixel Y is co-located with a chroma pixel, either Cr or Cb. In the first and second rows of the picture 100(0), 100(1), each alternate luminance pixel Y in the horizontal direction is co-located with a Cr pixel (indicated by an R). In the third and fourth of the picture 100(2), 100(3), each alternate luma pixel Y in the horizontal direction is co-located with a Cb pixel (indicated by a B). The foregoing pattern is repeated for each line in the frame. Accordingly, in rows 100(4i), 100(4i+1) (where i is an integer), each alternating luma pixel Y in the horizontal direction is co-located with a Cr pixel. In rows 100(4i+2), 100(4i+3), each alternating luma pixel in the horizontal direction is co-located with a Cb pixel.

Where the chroma format of the decoded pictures (decoded chroma format) and the chroma format of the display pictures (display chroma format) are different, chroma pixels corresponding to chroma pixel positions in the display chroma format are interpolated from the chroma pixels in the decoded picture that are nearest or surround the chroma pixel positions. During display, the chroma pixels in the decoded frame are replaced by the interpolated chroma pixels that are displayed in their corresponding chroma pixel positions in the display chroma format.

For example, where the decoded chroma format is DV-25 4:2:0 (as shown in FIG. 4), and the display chroma format is 4:2:2 (as shown in FIGS. 2 and 3), a picture with the 4:2:2 chroma format is generated by interpolating pixels in the chroma pixel positions for the 4:2:2 formatted picture 100 from the chroma pixels in the DV25 4:2:0 chroma format. In 4:2:2 formatted picture, each alternating luma pixel Y is co-located with chroma pixels Cr and Cb. However, in the DV25 4:2:0 format, each alternating luma pixel Y is co-located with either a Cr or Cb pixel.

In the top field, row 100(2), and the bottom field row 100(3), each luma pixel is co-located with a chroma Cb pixel. In the top field, the chroma Cr pixels in row 100(0) are located two pixels above the chroma Cr pixel positions in row 100(2), and the chroma Cr pixels in row 100(4) are located two pixels below the chroma Cr pixel positions in row 100(2). In the bottom field, the chroma Cr pixels in row 100(1) are located two pixels above the chroma Cr pixel positions in row 100(3), and the chroma Cr pixels in row 100(5) are located two pixels below the chroma Cr pixel positions in row 100(5). Accordingly, chroma Cr pixels for the chroma Cr pixel positions in row 100(2) can be interpolated from the chroma Cr pixels in rows 100(0) (the top pixels) and 100(4) (bottom pixels). Similarly, chroma Cr pixels for the chroma Cr pixel positions in row 100(3) can be interpolated from the chroma Cr pixels in rows 100(1) (the top pixels) and 100(5) (bottom pixels).

In the top field, row 100(4), and the bottom field row 100(5), each luma pixel is co-located with a chroma Cr pixel. In the top field, the chroma Cb pixels in row 100(2) are located two pixels above the chroma Cr pixel positions in row 100(4), and the chroma Cr pixels in row 100(6) are located two pixels below the chroma Cr pixel positions in row 100(2). In the bottom field, the chroma Cb pixels in row 100(3) are located two pixels above the chroma Cr pixel positions in row 100(5), and the chroma Cb pixels in row 100(7) are located two pixels below. Accordingly, chroma Cb pixels for the chroma Cb pixel positions in row 100(4) can be interpolated from the chroma Cb pixels in rows 100(2) (the top pixels) and 100(4) (bottom pixels). Similarly, chroma Cb pixels for the chroma Cb pixel positions in row 100(5) can be interpolated from the chroma Cb pixels in rows 100(3) (the top pixels) and 100(7) (bottom pixels).

Additionally, it is noted that top pixels, e.g., the Cr pixels in 100(4$i$+1) are displayed immediately prior to use for interpolating with subsequent lines 100 (4$i$+2), 100(4$i$+3). The bottom pixels, e.g., the Cr pixels in row 100(4$i$+2) are displayed immediately after use for interpolating preceding lines 100(4$i$), 100(4$i$+1).

During the time period following each horizontal synchronization pulse, the display engine 50 provides the row of chroma Cr and Cb pixels for display. Accordingly, at a related time, the display engine 50 fetches the row of luma pixels Y from the frame buffer. However, where the decoded chroma format is different from display chroma format, the display engine 50 fetches the row(s) of pixels in the decoded picture from the frame buffer 48 comprising the top pixels and the bottom pixels, at the related time. Thus, the particular line fetches, and therefore, the addresses, at the related time can vary depending on the decoded chroma format and the display chroma format. The related time can occur during a brief period following the horizontal synchronization pulse known as the horizontal blanking interval.

The addresses of the luma row Y and the chroma rows Cr/Cb fetched, can also vary based on the storage format used by the video decoder 45 to store a decoded picture. The video decoder 45 can also store a decoded picture 100 in a number of different ways. In the planar format, the luma pixels are stored in raster order in one array, the chroma Cr pixels are stored in raster order in a second array, and the chroma Cb pixels are stored in raster order in a third array. In the packed YUV format, the luma, chroma Cr, and chroma Cb pixels are packed together in a single array in raster order. One advantage of the packed YUV format is that reading consecutive memory locations produces a rasterized bitstream of the luma, chroma Cr, and chroma Cb pixels.

Another format for storing decoded frames is known as the macroblock format. Referring now to FIGS. 5A-C, there is illustrated a block diagram describing the storage of an interlaced picture 100 in the macroblock storage format. Several encoding and compression standards provide for a picture to be divided into two-dimensional blocks of luma pixels, chroma Cr pixels, and chroma Cb pixels. For example, the luma pixels are divided into 16×16 pixel blocks. The chroma pixels Cr/Cb co-located with the block of luma pixels form the block of chroma pixels. In the case of a DV25 frame, each 16×16 pixel luma block $M^Y$ is associated with a 16×8 pixel block of chroma Cr/Cb pixels $M^C$. A macroblock comprises a block $M^Y$ of luma Y pixels, and the block $M^C$ of chroma Cr and Cb pixels co-located therewith. The macroblocks are encoded, compressed, and represented by a data structure. The picture in its encoded and compressed form, is represented by the data structures representing the constituent macroblocks.

During decoding, each block $M^Y/M^C$ is decoded. As each macroblock $M^Y/M^C$ is decoded, the video decoder stores the macroblock $M^Y/M^C$ into a memory. A consecutive set of memory locations in one array 48Y store the block $M^Y$ of luma pixels, and a consecutive set of memory locations in another array 48C store the block $M^C$ of chroma Cr and chroma Cb pixels together.

The video decoder 45 decodes the macroblocks $M^Y/M^C$ starting from $M^Y_{0,0}/M^C_{0,0}$ through $M^Y_{0,NMBX-1}/M^C_{0,NMBX-1}$ proceeding to macroblock row 1, $M^Y_{1,0}/M^C_{1,0}$ . . . $M^Y_{1,NMBX-1}/M^C_{1,NMBX-1}$ proceeding consecutively to macroblock row NMBY-1, $M^Y_{NMBY-1,0}/M^C_{NMBY-1,0}$ through $M^Y_{NMBY-1,0}/M^C_{NMBY-1,NMBX-1}$. As the video decoder 45 decodes each macroblock $M^Y/M^C$, the block of luma pixels $M^Y$ are stored in one array 48Y of data words 48Y(0), . . . , while the block of chroma pixels $M^C$ are stored in another array 48C of data words 48C(0), . . . , .

The data words 48Y( ), 48C( ) can comprise 16 byte/128 bit gigantic words (gwords). Where a luma block $M^Y$ comprises a 16×16 block of luma pixels, in other words 16 rows of 16 luma pixels, each row of 16 luma pixels in the block are stored in a single data word 48Y( ). Additionally, each block is stored in 16 consecutive data words 48($i$), 48($i$+1) . . . 48($i$+15).

Unlike the planar storage format, or the packed YUV storage format, however, reading consecutive memory locations where the macroblock format is used does not result in a rasterized bitstream. In other words, pixels that are adjacent in raster order are not necessarily stored in adjacent data words 48Y( ), 48C( ). For example reading consecutive data words 48Y($i$) and 48Y($i$+1) results in a first 16 consecutive luma pixels in one row, followed by another 16 pixels directly below the first 16 pixels, unless the first 16 pixels are the last row or at the bottom of a block $M^Y$. Where the first 16 pixels are the last or bottom row of a block, the second 16 pixels are the top pixels of the next macroblock.

Accordingly, the addresses of the pixels to be fetched by the display engine 50 at a given time vary based on the storage format used for storing the decoded frame 100 as well as the decode and display chroma formats.

As mentioned above, a particularly complex case arises when interlaced decoded pictures with a decoded chroma format are to be displayed on a progressive display with a different display chroma format.

The above-mentioned disadvantages of the conventional approach in such a case can be avoided by providing a bitstream that comprises pixels from a top field and a bottom field. The pixels from the top field and bottom field are in the deinterlaced order. As noted above, the top field comprises the even-numbered rows 100(0), 100(2), . . . , 100(N–1), while the bottom field comprises odd-numbered rows 100 (1), 100(3), . . . 100(N). In the deinterlaced order, the rows are ordered alternating from the top field and bottom field, resulting in the order 100(0), 100(1) . . . 100(N).

Where the decode chroma format is different from the display chroma format, the bitstream comprises a top field and bottom field with the display chroma format, generated from the decoded top field and bottom field stored in the frame buffer 48. As noted above, the top field and the bottom field with a display chroma format can be generated from a top field and bottom field with a decoded chroma format by interpolating pixels in chroma positions in the display chroma format from pixels in the decoded chroma format. The bitstream is synchronized with the display wherein the pixels are provided at times related to display time and provided to the deinterlacing filter. The deinterlacing filter generates a progressive frame for display. The display engine 50 fetches the requisite pixels for generating each pixel in the progressive frame at times related to the display times for the pixels in the progressive frame.

Referring now to FIG. 6, there is illustrated a block diagram of the display engine 50 in accordance with an embodiment of the present invention. The display engine 50 includes a scalar 705, a compositor 710, a feeder 715, and a deinterlacing filter 720. The feeder 715 provides a bitstream that comprises pixels from a top field and a bottom field in the deinterlaced order. The pixels from the top field and bottom field are in the deinterlaced order. Where the decode chroma format is different from the display chroma format, the bitstream comprises a top field and bottom field with the display chroma format, generated from the decoded top field and bottom field stored in the frame buffer 48. As noted above, the top field and the bottom field with a display chroma format can be generated from a top field and bottom field with a decoded chroma format by interpolating pixels in chroma positions in the display chroma format from pixels in the decoded chroma format. The bitstream is synchronized with the display wherein the pixels are provided at times related to display time and provided to the deinterlacing filter 720. The deinterlacing filter 720 generates a progressive frame for display. The display engine 50 fetches the requisite pixels for generating each pixel in the progressive frame at times related to the display times for the pixels in the progressive frame.

In one embodiment, at each horizontal synchronization pulse, the host processor 90 can program the display engine 50 with the address of the data words 48( ) storing luma pixels and chroma pixels. The data word 48Y( ) storing the luma pixels stores the first pixels of a row 100( ) for display at the horizontal synchronization pulse. The data word 48( ) storing the chroma pixels store the first chroma pixels Cr/Cb in the row 100( ) comprising the top and/or bottom pixels for interpolating the chroma pixels to be displayed following the horizontal synchronization pulse. However, calculating the addresses at each horizontal synchronization pulse consumes considerable bandwidth.

Instead, the host processor 90 provides the feeder 715 with the starting address of the decoded pictures. The feeder 715 calculates the starting address for each row of the luma pixels Y to be displayed and the row of the chroma pixels Cr/Cb containing the top and/or bottom pixels for interpolating the chroma pixels to be displayed.

However, where the decoded pictures are interlaced, the pixels are fetched from the top field, and the bottom field in an alternating order. The top field and bottom field can be stored at unrelated memory locations in the frame buffers. As a result, the addresses for the pixels to fetch can come from two contexts.

Referring now to FIG. 7, there is illustrated a block diagram describing an exemplary feeder 715 in accordance with an embodiment of the present invention. The feeder 715 provides a bitstream comprising pixels at a time related to the time the pixels are to be displayed by the display device 65. The bitstream comprises chroma pixels in the chroma pixel positions in accordance with the display format. At each horizontal synchronization pulse, a row 100(x) is presented.

In the case where the decode picture is interlaced and has a decoded chroma format that is different from the display chroma format, the feeder 715 provides a bitstream comprising a top field and the bottom field in the deinterlaced order, with the display chroma format. The top field and bottom field with the display format are generated from the decoded top field and bottom field with the decoded chroma format.

At each vertical synchronization pulse, the host processor 90 programs the feeder 715 with the addresses of the frame buffer memory locations storing the first luma pixels and the first chroma pixel(s) for display (i.e., the left most pixels in row 100(0)), and the format of the decoded frame.

The foregoing parameters are provided to the feeder 715 via the RBUS interface 805. After providing the parameters to the RBUS interface 805, the host 90 sets a start parameter in the RBUS interface 805.

The RBUS interface 805 provides the initial starting luma and chroma addresses to the BRM 815. When the BRM 815 receives the starting luma and chroma addresses, the start parameter in the RBUS interface 805 is deasserted. The BRM 815 issues the commands for fetching the luma and chroma pixels in the first line of the frame/field. The IDWU 820 effectuates the commands.

The BRM 815 includes a command state machine 815a and horizontal address computation logic 815b. The command state machine 815a can issue commands to the IDWU 820 causing the feeder 715 to fetch pixels from the frame buffer at a memory address provided by the command state machine 815a. The command state machine initially commands the IDWU 820 to fetch the pixels at the starting luma and chroma addresses. The horizontal computation logic 815b maintains the address of the frame buffer 48 location storing the next pixels in the display order.

The IDWU 820 writes the fetched pixels to a double buffer 840 until the double buffer 840 is full. After the double buffer 840 is full, the double buffer state machine detects when half of the data in the double buffer 840 is consumed. Responsive thereto, the command state machine 815a commands the IDWU 820 to fetch the next pixels in the display order, starting at the address calculated by the horizontal address computation logic 815*b*, until the double buffer 840 is full. The foregoing continues for each pixel in the first line 100(0).

A line address computer 810 calculates the address of the memory locations storing the starting pixels of the next line, e.g., line 100(1) if a progressive display or line 100(2) if an interlaced display. The BRM 815 causes the IDWU 820 to start fetching pixels from the provided starting address. For each horizontal synchronization pulse, the line address computer 810 provides the address of the memory locations storing the first pixel (leftmost) of a row of luma pixels. The line address computer 810 provides the address storing the first pixel of consecutive rows of luma pixels 100(0), 100(1), . . . , 100(N) if the display is progressive. The line address computer 810 provides the address storing the first pixel of alternating rows of luma pixels 100(0), 100(2), . . . , 100(N−1), 100(1), 100(3). . . 100(N) if the display device 65 is interlaced.

Additionally, as noted above, the feeder 715 interpolates chroma pixels for the chroma pixel positions in the display frame from the pixels in the decoded frame. For the display format 4:2:2, as can be seen in FIGS. 2 and 3, the chroma pixels are co-located with luma pixels. When the feeder 715 fetches a row of luma pixels, 100(*x*), the feeder 715 also interpolates the chroma pixels in the chroma pixel positions in row 100(*x*), from the chroma pixels in the decoded frame format. The pixels are interpolated from a row of top pixels and a row of bottom pixels. Accordingly, the line address computer 810 calculates the address of the starting chroma pixels in the chroma pixel rows needed for interpolating.

In the case where the decoded picture is interlaced and has a decoded chroma format that is different from the display chroma format, the line address computer 810 calculates the addresses of the starting pixels for the luma and the chroma row comprising the top and/or bottom pixels for the next row in the deinterlaced order.

The line address computer 810 can calculate the addresses of the starting pixels of each row by adding increments to the addresses of the previous row. For the macroblock format, the increments can comprise a row stride and a line stride. In such a case, the line address computer 810 maintains the starting address of the previous row for calculating the starting address for the next row.

However, in the case where the decoded picture is to be deinterlaced, the line address computer 810 fetches pixels from the top field and bottom field in alternating order at each horizontal synchronization pulse. The starting addresses for the top field are calculated by adding an increment to the starting address of the previous row in the top field. The starting addresses for the bottom field are calculated by adding an increment to the starting address of the previous row in the bottom field. Accordingly, the line address computer 810 maintains two contexts.

Additionally, at each horizontal synchronization pulse, the line address computer 810 provides the interpolation weights, $WCb_T$, $WCb_B$, $WCr_T$, and $WCr_B$ for interpolation to a chroma filter. The interpolation weights depend on the decoded frame format, the display format, and the specific row with the chroma pixel positions.

A pixel feeder 835 comprises an endian swizzle & pixel select logic 835*a*, a chroma filter data path 835*b*, a chroma line buffer 835*c*, an output data path 835*d*, fixed color generation logic 835*e*, and a double buffer read state machine 835*f*. The double buffer state machine 835*f* performs various duties that manage the pixel feeder 835. The duties include maintaining the double-buffer 840 status, reading pixels from the double buffer 840, sequencing the chroma filter datapath 835*b*, and loading pixels onto the FIFO 830.

The pixels are fetched from the frame buffer and stored in the double buffer 840 in their native byte-packing format. The read state machine 835*f* creates a rasterized data stream from the luma pixel data as well as associated chroma pixel bitstream(s). The luma pixel data stream and the chroma pixel bitstream(s) are synchronized with respect to each other, such that the luma pixels in the stream at a particular time and the chroma pixels in the stream(s) at a particular time are either co-located, or the bottom pixels for the chroma pixel positions co-located with the luma pixels.

In the case where the decoded frame is in the packed YUV format, a single data stream includes both the luma and chroma pixels. The endian swizzle & pixel select logic converts the byte-packing format to the byte-packing format of the display format and separates the chroma pixels from the bitstream, thereby creating a chroma bitstream.

The chroma filter 835*b* receives the chroma portion of the bitstream and converts the chroma format to the chroma format of the display format. As noted above, the chroma pixels in a row for the display format can be interpolated from more than one row. To reduce the number of row fetches to either one chroma row or one chroma Cr row and one chroma Cb row per horizontal synchronization pulse, the chroma line buffer 835*c* can store one chroma Cr row and one chroma Cb row.

In the case where the display is progressive and the decoded frame is interlaced and in a different decoded chroma format from the display format, the chroma filter 835*b* can store one chroma Cr row and one chroma Cb row from the top field and one chroma Cr row and one chroma Cb row from the bottom field.

As noted earlier, in the case where the decoded frame format is DV-25 4:2:0, and the display format is 4:2:2, the top pixels for interpolating chroma pixels are displayed immediately prior to use as top pixels for interpolation. Bottom pixels are displayed immediately after use as bottom pixels for interpolation. Accordingly, when top pixels are displayed, the top pixels can be buffered in the chroma line buffer 835*c* used for interpolating the chroma pixels for the subsequent row after the next horizontal synchronization pulse. Similarly, when the bottom pixels are used for interpolating, the bottom pixels can be stored in the chroma line buffer 835*c* for displaying immediately after the next horizontal synchronization pulse.

In the case where the display chroma format is 4:2:2 progressive and the decoded frame is interlaced with the DV25 4:2:0 chroma format, top pixels in both the top field and bottom field are displayed two rows prior to use as top pixels for interpolation. Bottom pixels in both the top field and bottom field are displayed two lines after use as bottom pixels for interpolation.

Accordingly, when top pixels are displayed, the top pixels can be buffered in the chroma line buffer 835*c* for use interpolating the chroma pixels for the subsequent row. Similarly, when the bottom pixels are used for interpolating, the bottom pixels can be stored in the chroma line buffer 835*c* for subsequently displaying. Therefore, chroma line buffer 835*c* can buffer top lines and bottom lines for both the top field and bottom field.

Referring now to FIG. 8, there is illustrated a block diagram describing the line address computer 810 datapath in accordance with an embodiment of the present invention. At each Vsynch, the host 90 provides the starting addresses of the top field and bottom field from which a progressive frame is to be generated and displayed to the RBUS Interface 805. The starting addresses include the starting address for the luma Y and chroma pixels Cr/Cb. The starting addresses for the top field are stored in luma top field starting address register 905YT and chroma top field starting address register 905CT at the RBUS Interface Module 805. The starting addresses for the bottom field are stored in luma bottom field starting address register 905YB and chroma bottom field starting address register 905CB at the RBUS Interface Module 805.

The LAC 810 includes a top field present luma address register 910YT, a top field present chroma address register 910CT, a bottom field present luma address register 910YB, and a bottom field present chroma address register 910CB. The present address registers 910 receive the contents of either the top/bottom field starting address registers 905 or a feedback path from an adder 915. The particular contents provided to the present address register 910, the feedback from the adder 915 or the top/bottom field address register 905, are determined by multiplexers 920. The multiplexers 920 provide the contents of the top/bottom field address registers 905 to the present address registers 910 while fetching the first row of the top and bottom field, in other words, rows 0 and 1. Otherwise, the multiplexers 920 provide the contents of the feedback loop.

The starting address for a row in the top field 100(2*i*) is calculated from the starting address of the previous line 100(2*i*–2) in the top field, (or the starting address of the frame) by adding an increment via an adder 915. The starting address for a row in the bottom field 100(2*i*+1) is calculated from the starting address of the previous line 100(2*i*–1) in the bottom field by adding an increment via the adder 915.

The adder 915 receives an address through a stage of multiplexers 925, 930, and 935. The first multiplexer 925 selects between the contents of registers 905 and registers 910. When fetching the first two rows, 100(0), 100(1), the multiplexers 925 select the registers 905. Otherwise, the mulitplexers 925 select the registers 910.

Multiplexer 925YT selects between the top field luma starting address register 905YT and the top field present luma starting address register 910YT. Multiplexer 925YB selects between the bottom field luma starting address register 905YT and the bottom field present luma starting address register 910YT. Multiplexer 925CT selects between the top field luma starting address register 905CT and the top field present luma starting address register 910CT. Multiplexer 925CB selects between the bottom field luma starting address register 905CT and the bottom field present luma starting address register 910CT.

The next multiplexer stage 930 selects between the outputs of multiplexers 925. The multiplexer stage 930 selects the output of the multiplexers 925 that are associated with either the top field or bottom field. During horizontal synchronization periods where an even numbered line is to be displayed, the multiplexer stage 930 selects the outputs of the multiplexers 925YT and 925CT. During horizontal synchronization periods where an odd numbered line is to be displayed, the multiplexer stage 930 selects the outputs of the multiplexers 925YB and 925CB. The multiplexer 935 coordinates selection between the outputs of multiplexers 930Y and 930C, depending on whether a chroma row or luma row is needed.

The adder 915 receives the output of multiplexer 935 and the output of an increment circuit 907. The increment circuit 907 receives an MPEG luma line stride, an MPEG chroma line stride, a row stride, and a packed line stride. The increment circuit 907 selects the appropriate increment based upon a signal provided to multiplexers 940, 945 therein. The signal luma line stride select selects between the MPEG luma line stride and the packed line stride, based on the source video format. If the source video format is packed YUV format, the luma line stride select causes multiplexer 940 to select the packed line stride. Otherwise, the luma line stride select causes multiplexer 940 to select the MPEG luma line stride. The second multiplexer 945 receives the output of the first multiplexer 940, the MPEG chroma line stride, the row stride, and 0. The second MUX selects one of the foregoing on the basis of a line update select signal.

The computation of the line addresses for the chroma and luma lines is shown in the table below.

| Image Format: (MPEG/ TM5/DV25/ Packed) | Chroma Type: (4:2:0/ 4:2:2/ 4:1:1) | Display Type: (Progressive/ Interlaced) | Luma Line Address Bit[7:4] | Luma Line Address Computation Description | Chroma Line Address Bit[7:4] | Chroma Line Address Computation Description |
|---|---|---|---|---|---|---|
| MPEG1/ MPEG2/ MPEG4/ TM5/ DV25 | 4:2:0/ 4:2:2/ 4:1:1 | Interlaced | Top Field/Bottom Field 00 to 1D | TLumaAddr <= TLuma_Addr + MPEG_ Luma_Line_Stride; BLumaAddr <= BLuma_Addr + MPEG_ Luma_Line_Stride; | Top Field/Bottom Field 00 to 1D | TChroma_Addr = TChroma_Addr + MPEG_Chroma_Line_Stride; BChroma_Addr = BChroma_Addr + MPEG_Chroma_Line_Stride; |
| | | | Top Field 1E | TLuma_Addr <= TLuma_Addr + Row_Stride; | Top Field 1E | TChroma_Addr <= TChroma_Addr + Row_Stride; |
| | | | Bottom Field 1F | BLuma_Addr <= BLuma_Addr + Row_Stride; | Bottom Field 1F | BChroma_Addr <= BChroma_Addr + Row_Stride; |
| Packed YUV | | Progressive/ Interlaced | Unused | Line_Addr <= Line_Addr + Packed_Line_Stride; | Unused | NA |

Note:
The Line start addresses (Luma/Chroma) are in terms of byte addresses for all image formats. Hence, the line address increments (Luma line stride, Chroma line stride and Row stride) are also in terms of bytes.
Example: For HD image (1920X1080),
MPEG1/MPEG2/MPEG4/TM5/DV25:
NMBX = Number of macro-blocks in horizontal direction
Source Type = Field, Display Type = Progressive, Chroma Type = 4:2:0 and NMBX = 120, then MPEG_Luma_Line_Stride = 16 * 2 = 32; MPEG_Chroma_Line_Stride = 16 * 2 = 32; Row_Stride = (((120 * 32) − 28) * 8) = 30496.

The foregoing calculations can be effectuated by appropriate logic, a state machine, or a look-up table in the line address computer.

Referring now to FIG. 9, there is illustrated a block diagram of the vertical chroma filter 835bv. The vertical chroma filter 835bv receives a bitstream of chroma pixels C and interpolates chroma pixels for the output format in the vertical direction. In the case where the decoded frame is an interlaced frame and the display is progressive, the bitstream comprises chroma pixels C from the top field and bottom field.

The chroma pixels C are fetched either one or two rows at a time. Where the chroma pixels are read two lines at a time, one line includes chroma Cr pixels and the other line includes chroma Cb pixels. The luma pixel data stream and the chroma pixel bitstream(s) are synchronized with respect to each other, such that the luma pixels in the stream at a particular time and the chroma pixels in the stream(s) at a particular time are either co-located, or the bottom pixels for the chroma pixel positions co-located with the luma pixels.

As noted earlier, in the case where the decoded chroma format is DV-25 4:2:0 and interlaced, and the display chroma format is 4:2:2 and progressive, the top pixels for interpolating chroma pixels are displayed two rows prior to use as top pixels for interpolation. Bottom pixels are displayed two rows after use as bottom pixels for interpolation. Accordingly, when top pixels from the top field are displayed, the top pixels can be buffered in the chroma line buffer 835(0) for use interpolating the chroma pixels for the second subsequent row. Similarly, when the bottom pixels from the top field are used for interpolating, the bottom pixels can be stored in the chroma line buffer 835(1) for displaying after the second subsequent horizontal synchronization pulse. When top pixels from the bottom field are displayed, the top pixels can be buffered in the chroma line buffer 835(2) for use interpolating the chroma pixels for the second subsequent row. Similarly, when the bottom pixels from the bottom field are used for interpolating, the bottom pixels can be stored in the chroma line buffer 835(3) for displaying after the second subsequent horizontal synchronization pulse. The chroma line buffers 835(0) and 835(1) are associated with the top field context. The chroma line buffers 835(2) and 835(3) are associated with the bottom field context.

In the case where the display format is 4:2:2, the vertical chroma filter 835bv interpolates chroma pixels for the chroma pixel positions that are co-located with the luma pixels in the luma bitstream.

The vertical chroma filter 835bv includes multiplexers 1005T, 1005B, and context switch 1007. The context switch 1007 selects between the chroma line buffers 835 associated with the top field context and associated with the bottom field contexts. During horizontal synchronization pulses associated with even-numbered rows, the context switch 1007 selects the chroma line buffers 835 associated with the top field context, chroma line buffers 835(0), 835(1). During horizontal synchronization pulses associated with odd-numbered rows, the context switch 1007 selects the chroma line buffers 835 associated with the bottom field context, chroma line buffers 835(2), 835(3).

The switch 1007 has two outputs, the top pixels and the bottom pixels. Each multiplexer 1005 selects between the outputs from the context switch 1007. The selection of the multiplexer 1005T provides the top pixels, while the selection of the multiplexer 1005B provides the bottom pixels. Where a chroma pixel in the decoded frame format is co-located with a chroma pixel location in the display format (such as chroma Cr pixels in line 100(0)), the chroma pixel value is used. However, the chroma pixel is considered the bottom pixel, and a weight: $WCr/Cb_B=1$, while $WCr/Cb_T=0$.

The multiplexer 1005T provides the top pixels to a top multiplier 1015T. The top multiplier 1015T also receives a top weight, $WCr/Cb_T$ from the line address computer 810. The multiplexer 1005B provides the bottom pixels to a bottom multiplier 1015B. The bottom multiplier 1015B also receives a bottom weight, $WCr/Cb_B$ from the line address computer 810. The multipliers 1015 multiply the chroma pixels with the provided weight, and provide the product to an adder 1020. The adder 1020 sums the products of the multipliers 1015T, 1015B. The output of the adder 1020 is the interpolated chroma pixel for the output format.

The chroma line buffers 835, multiplexers 1005, 1015, and the selector 1007 can be controlled by signals provided by appropriate state machine hardware, logic, in the double buffer read state machine.

The table below indicates the chroma line received from the line address computer 810, the selections of the context selector 1007, multiplexers 1005T, 1005B, the weights provided by the line address computer 810 to the multipliers 1015T, 1015B, and buffer writes to chroma line buffers 835(0), 835(1), 835(2), and 835(3), where the decoded chroma format is DV-25 and Interlaced and the display chroma format is MPEG 4:2:2 and Progressive.

| Luma Line in Bitstream | Chroma Row in Bitstream | Selections of MUX Weights and Buffer Writes |
|---|---|---|
| DV-25 Interlaced => 4:2:2 Progressive | | |
| 100(4i) | Cb in row 100(4i + 2) | Selector => Top Field Context, CLB0, CLB1<br>1015T/Cr -> X<br>$WCr_T = 0$<br>1015B/Cr -> CLB0<br>$WCr_B = 1.00$<br>1015T/Cb -> CLB1<br>$WCb_T = 0.5$<br>1015B/Cb -> C Bitstream<br>$WCb_B = 0.5$<br>Write Bitstream (Cb in row 100(4i + 2)) to CLB1 |
| 100(4i + 1) | Cb in row 100(4i + 3) | Selector => Bottom Field Context, CLB2, CLB3<br>1015T/Cr -> X<br>$WCr_T = 0$<br>1015B/Cr -> CLB2<br>$WCr_B = 1.00$<br>1015T/Cb -> CLB3<br>$WCb_T = 0.5$<br>1015B/Cb -> Bitstream<br>$WCb_B = 0.5$<br>Write Bitstream (Cb in row 100(4i + 3)) to CLB3 |
| 100(4i + 2) | Cr in row 100(4i + 4) | Selector => Top Field Context, CLB0, CLB1<br>1015T/Cr -> CLB0<br>$WCb_T = 0.5$<br>1015B/Cr -> C Bitstream<br>$WCb_B = 0.5$<br>1015T/Cb -> X<br>$WCr_T = 0$<br>1015B/Cb -> CLB1<br>$WCr_B = 1.00$<br>Write Bitstream (Cr in row 100(4i + 4)) to CLB0) |
| 100(4i + 3) | Cr in row 100(4i + 5) | Selector => Bottom Field Context, CLB2, CLB3<br>1015T/Cr -> CLB2<br>$WCb_T = 0.5$ |

-continued

DV-25 Interlaced => 4:2:2 Progressive

| Luma Line in Bitstream | Chroma Row in Bitstream | Selections of MUX Weights and Buffer Writes |
|---|---|---|
| | | 1015B/Cr -> C Bitstream<br>$WCb_B = 0.5$<br>1015T/Cb -> X<br>$WCr_T = 0$<br>1015B/Cb -> CLB3<br>$WCr_B = 1.00$<br>Write Bitstream (Cr in row 100(4i + 5)) to CLB2 |

The table below indicates the chroma line received from the line address computer 810, the selections of the context selector 907, multiplexers 1005T, 1005B, the weights provided by the line address computer 810 to the multipliers 1015T, 1015B, and buffer writes to chroma line buffers 835(0), 835(1), 835(2), and 835(3), where the decoded chroma format is MPEG 4:2:0 and Interlaced and the display chroma format is 4:2:2 and Progressive.

MPEG 4:2:0 Interlaced to 4:2:2 Progressive

| Luma Line in Bitstream | Chroma Row in Bitstream | Selections of MUX Weights, Buffer Writes |
|---|---|---|
| 100(4i + 2) | 100(4i + 4.5) | Selector => Top Field Context<br>1015T(Cr/Cb) -> CLB0<br>$W_T(Cr/Cb) = 0.625$<br>1015B/Cr -> C Bitstream<br>$W_B(Cr/Cb) = 0.375$ |
| 100(4i + 3) | 100(4i + 6.5) | Selector => Bottom Field Context<br>1015T(Cr/Cb) -> CLB2<br>$W_T(Cr/Cb) = 0.875$<br>1015B/Cr -> C Bitstream<br>$W_B(Cr/Cb) = 0.125$ |
| 100(4i + 4) | 100(4i + 4.5) | Selector => Top Field Context<br>1015T(Cr/Cb) -> CLB0<br>$W_T(Cr/Cb) = 0.875$<br>1015B/Cr -> C Bitstream<br>$W_B(Cr/Cb) = 0.125$<br>Write bitstream (C in row 100(4i + 4.5)) to CLB0 |
| 100(4i + 5) | 100(4i + 6.5) | Selector => Bottom Field Context<br>1015T(Cr/Cb) -> CLB2<br>$W_T(Cr/Cb) = 0.375$<br>1015B/Cr -> C Bitstream<br>$W_B(Cr/Cb) = 0.625$<br>Write bitstream (C in row 100(4i + 4.5)) to CLB1 |

The table below indicates the chroma line received from the line address computer 810, the selections of the context selector 907, multiplexers 1005T, 1005B, the weights provided by the line address computer 810 to the multipliers 1015T, 1015B, and buffer writes to chroma line buffers 835(0), 835(1), 835(2), and 835(3), where the decoded chroma format is MPEG-2 TM5 4:2:0 and Interlaced and the display chroma format is 4:2:2 and Progressive.

MPEG-2 TM5 4:2:0 Interlaced to 4:2:2 Progressive

| Luma Line in Bitstream | Chroma Row in Bitstream | Selections of MUX Weights and Buffer Writes |
|---|---|---|
| 100(4i + 2) | 100(4i + 4) | Selector => Top Field Context<br>1015T(Cr/Cb) -> CLB0<br>$W_T(Cr/Cb) = 0.5$<br>1015B/Cr -> C Bitstream<br>$W_B(Cr/Cb) = 0.5$ |
| 100(4i + 3) | 100(4i + 6) | Selector => Bottom Field Context<br>1015T(Cr/Cb) -> CLB2<br>$W_T(Cr/Cb) = 0.75$<br>1015B/Cr -> C Bitstream<br>$W_B(Cr/Cb) = 0.25$ |
| 100(4i + 4) | 100(4i + 4) | Selector => Top Field Context<br>1015T(Cr/Cb) -> X<br>$W_T(Cr/Cb) = 0$<br>1015B/Cr -> C Bitstream<br>$W_B(Cr/Cb) = 1$<br>Write bitstream (C in row 100(4i + 4)) to CLB0 |
| 100(4i + 5) | 100(4i + 6) | Selector => Bottom Field Context<br>1015T(Cr/Cb) -> CLB2<br>$W_T(Cr/Cb) = 0.25$<br>1015B/Cr -> C Bitstream<br>$W_B(Cr/Cb) = 0.75$<br>Write bitstream (C in row 100(4i + 4)) to CLB0 |

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for displaying frames, said system comprising:
   a first memory for storing a top field;
   a second memory for storing a bottom field, the bottom field being associated with the top field; and
   a feeder for fetching a first line from the top field, fetching a first line from a bottom field corresponding to the top field after fetching the first line from the top field, and fetching a second line from the top field after fetching the first line from the bottom field, the second line from the top field being adjacent to the first line in the top field, said feeder further comprising:

a line address computer for calculating a starting address for a row of luma pixels and calculating a starting address for a row of chroma pixels.

2. The system of claim 1, wherein the line address computer calculates a starting address for another row of chroma pixels, wherein the another row of chroma pixels is adjacent to the row of chroma pixels.

3. The system of claim 2, wherein the pixel feeder further comprises a chroma filter for interpolating a chroma line from the row of chroma pixels and the another row of chroma pixels.

4. The system of claim 2, wherein the line address computer calculates a starting address for a row of luma pixels, calculates a starting address for a row of chroma pixels, and calculates a starting address for another row of chroma pixels.

5. The system of claim 4, wherein the chroma filter interpolates a chroma row from the row of chroma pixels and the another row of chroma pixels.

6. The system of claim 5, wherein the line address computer calculates a starting address for a row of luma pixels, calculates a starting address for a row of chroma pixels, calculates a starting address for another row of chroma pixels, wherein the another row of chroma pixels is adjacent to the row of chroma pixels, and wherein the line address computer interpolates a chroma row from the row of chroma pixels and the another row of chroma pixels.

\* \* \* \* \*